United States Patent [19]

Graham

[11] 4,343,441
[45] Aug. 10, 1982

[54] MAGNETIC TAPE REEL CLAMP WITH EXTENDED CENTER POLE

[75] Inventor: Scot M. Graham, Emsworth, England

[73] Assignee: International Business Machines Corporation, Armonk, N.Y.

[21] Appl. No.: 219,621

[22] Filed: Dec. 24, 1980

[51] Int. Cl.³ ............................................. B65H 17/02
[52] U.S. Cl. .................................... 242/68.1; 242/68.3
[58] Field of Search .................... 242/68.1, 68.3, 46.2, 242/129.7, 71.8

[56] References Cited

U.S. PATENT DOCUMENTS

| | | | |
|---|---|---|---|
| 2,437,997 | 3/1948 | Charlin | 242/68.3 X |
| 2,598,846 | 6/1952 | Smith et al. | 242/84.5 R |
| 2,709,051 | 5/1955 | Bunch | 242/68.3 |
| 3,396,919 | 8/1968 | Vayda | 242/68.3 X |
| 4,327,301 | 4/1982 | Janson | 242/68.3 X |

*Primary Examiner*—John M. Jillions
*Attorney, Agent, or Firm*—R. E. Cummins

[57] ABSTRACT

An apparatus for driving a replaceable reel of magnetic tape is disclosed. The apparatus comprises a magnetic clamp for holding the reel to a cup-shaped driving member. The cup-shaped driving member carries a doughnut-shaped magnet and is provided with an integral center shunt member which extends into the center of the reel when the reel is positioned in driving engagement. The reel is provided with a central opening, and a circular metal plate is attached to the bottom surface of the reel hub to be attracted by the doughnut-shaped magnet. By extending the center pole piece a predetermined distance above the plane of the doughnut-shaped magnet, the extended center pole piece provides an easy path for the flux as the members are being separated, since a relatively small air gap is maintained between the extended center pole and the central opening of the disk. At the point where the members separate, the strength of the magnetic field is not sufficient to adversely affect the information stored on the tape which is wound on the reel. In prior art arrangements, as the reel was being removed from the driving arrangement, the air gap which existed between the shunt member and a shorter center pole would increase to the point where the magnetic field would no longer be shunted through the metal shunt. The strength of the resulting stray magnetic flux was sufficient to adversely affect the information stored on the magnetic tape that was wound on the reel.

2 Claims, 5 Drawing Figures

U.S. Patent
Aug. 10, 1982
4,343,441
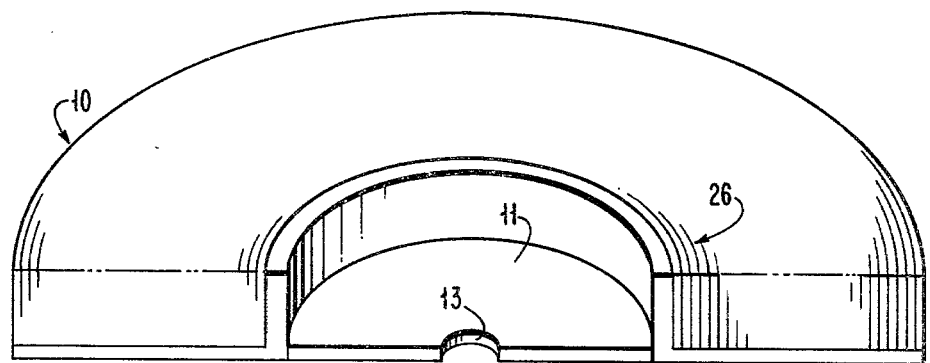
FIG. 1
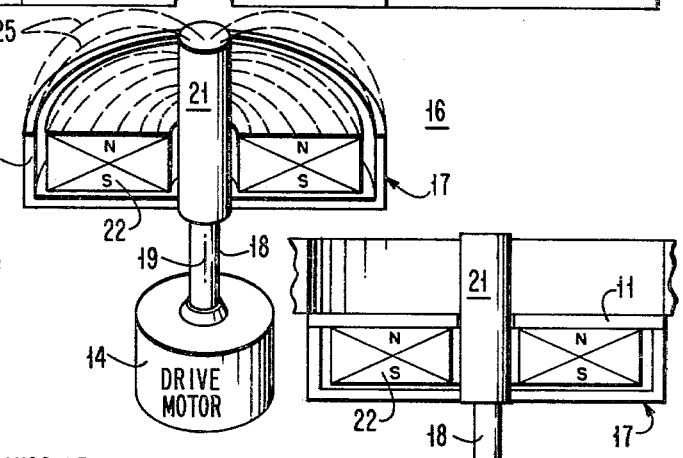
FIG. 1a
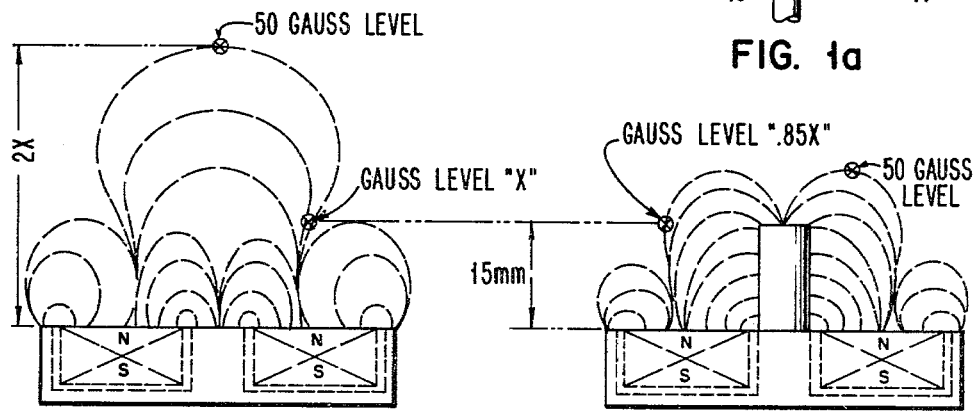
FIG. 2a
FIG. 2b
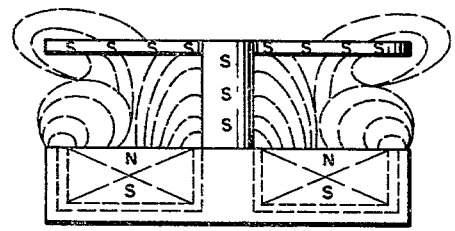
FIG. 3

MAGNETIC TAPE REEL CLAMP WITH EXTENDED CENTER POLE

DESCRIPTION

TECHNICAL FIELD

This invention relates in general to arrangements for driving a replaceable reel of magnetic tape and, in particular, to a magnetic clamping arrangement for holding the reel of magnetic tape in engagement with the driving member without adversely affecting information stored on the magnetic tape.

SUMMARY OF THE INVENTION

Magnetic tape transports generally employ a replaceable supply reel and either a fixed or a removable take-up reel. Various arrangements have been employed for driving supply and take-up reels and maintaining an appropriate driving relationship between the reel and the motor. In one known arrangement, the reel is held in driving engagement with the motor by means of a magnetic clamp which involves a metal plate attached to the reel hub which is attracted by a suitable magnet means associated with the driving member. In tape transports where the speed of the tape is relatively high, such as tape transports for storing digital data, and the acceleration and deceleration forces become substantial, a relatively high clamping force is desired to hold the reel in positive engagement with the driving member during acceleration and deceleration. The high clamping force is obtained by a relatively stronger magnet which tends to increase the strength of the flux field emanating from the magnet. When the reel is positioned on the drive, the flux field passes from one pole through the metal plate on the reel hub, back to the other pole of the magnet, and any stray flux that might affect the tape is minimized. However, as the reel is removed or as it is being inserted onto the drive, the stray flux tends to adversely affect the information stored on the magnetic reel if the clamping magnet is too strong.

It has been found in accordance with the present invention that the stray flux field can be better controlled if the center pole piece of the annular magnetic holder is extended upward a predetermined distance so that as the tape reel is being removed or inserted onto the drive, the strength of the field, at the point where the center opening in the plate attached to the tape reel hub surrounds the pole tip, is insufficient to adversely affect the data contained on the magnetic tape. While the strength of the flux field increases closer to the plane of the magnet, the magnetic plate functions as a shunt and prevents stray flux of any strength from reaching the tape since the field is shunted through the magnetic plate.

It is, therefore, an object of the present invention to provide an improved arrangement for clamping a magnetic tape reel to a driving element by a magnetic clamp which does not adversely affect information stored on the magnetic tape.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a sectional view of the magnetic clamp arrangement for clamping a magnetic tape reel; FIG. 1a illustrates the reel in the clamped position;

FIGS. 2a and 2b illustrate the difference in flux fields associated with a magnetic clamp when the center pole is extended;

FIG. 3 illustrates the flux field when the reel is positioned so that the metal shunt plate is just surrounding the center pole.

DESCRIPTION OF THE INVENTION

FIG. 1 illustrates a tape reel driving arrangement embodying the present invention. As shown in FIG. 1, the tape reel 10 is provided with a circular metal plate 11 which includes an opening 13 disposed coaxial with the axis of reel 10. Reel 10 is driven by motor 14 through the magnetic clamping arrangement 16.

As shown, the clamping arrangement comprises a cup-like member 17 which is rotated by motor shaft 18 about an axis 19. Member 17 is provided with a circumferentially disposed lip portion 20 and an extended center pole piece 21. An annular shaped magnet 22, which is polarized in the axial direction, is disposed in cup-shaped member 17.

Member 17 provides a flux field 25 as a result of the magnet 22 which creates an attractive force on the circular plate 11, thereby clamping the plate 11 to the edge of the cup-shaped member 17, as shown in FIG. 1a.

The strength of the magnetic field 25 provided by magnet 22 determines the clamping force. Where it is desired to have a relatively large clamping force, consideration must be given to the effect that the magnetic field 25 may have on the magnetic condition of the magnetic media 26 wound on the tape reel 10 as the reel 10 is being removed from or placed on the drive.

For purposes of explanation, it will be assumed that as the reel is loaded or removed, the plane of the metal disk 11 is substantially normal to the axis of revolution of the driving member as the reel is moved from its clamped position to its unclamped position.

FIG. 2a illustrates the distribution of the flux field when the center pole piece has not been extended. FIG. 2b shows the distribution of the flux field resulting from the extension of center pole 21, assuming the strength of the magnets are the same. By extending the center pole 21, the surface area of one pole is increased, which tends to alter the flux field caused by the axial orientation of magnet 22. The effect is to lower the density at which a certain flux density level occurs or, stated differently, the effect is to lower the flux density a predetermined distance. For example, if the center pole is lengthened causing a 65% increase in pole area, the flux density at 15 mm from the magnet surface is reduced 25%. It will also be seen that the 50 gauss iso flux line in FIG. 2b is reduced by 50% from the 50 gauss iso flux line in FIG. 2a.

As a result of the reduction in the strength of the field, the tape reel may be lowered towards the magnet without the information recorded on the tape media being adversely affected by the flux field. At the point in the loading process corresponding to FIG. 3 where the plate 11 is just even with the distal end of the center pole 22, the annular gap defined by the center pole and the opening in the disk is sufficiently small so that the plate 11 shunts substantially all of the field from the center pole horizontally through the plate where it is returned back to the edge 20 of cup-shaped member 17. Substantially all of the field, therefore, acts as a clamping force on the plate 11 and member 17.

The arrangement disclosed permits a relatively strong magnetic clamping force to be developed by employing a relatively strong magnet without adversely affecting the information recorded on the media which is wound on the reel to be clamped by the magnetic clamp.

While the invention has been particularly shown and described with reference to a preferred embodiment thereof, it will be understood by those skilled in the art that various other changes in the form and details may be made therein without departing from the spirit and scope of the invention.

Having thus described my invention, what I claim as new and desire to secure by Letters Patent is:

1. An arrangement for releaseably clamping a reel of magnetic tape to a driving motor comprising a magnetic clamp having a doughnut-shaped magnet and magnet holder mounted for rotation with said motor, said magnet holder having a center pole which is disposed coaxially with said motor shaft for receiving said doughnut-shaped magnet and extending a predetermined distance above the surface of said magnet, said magnetic clamp further including a circular metal plate attached to the hub portion of said reel and adapted to engage said magnet holder, said magnet being polarized in an axial direction to provide a flux field which extends from said center pole to the circumferentially disposed edge portion of said magnet holder when no reel is disposed on said clamp, said center pole being extended to a point where the strength of the magnetic field is insufficient to adversely affect the magnetic condition of said magnetic tape and the shunting effect of said metal plate is not required to protect the tape.

2. An arrangement for holding a reel of magnetic tape releaseably in driving engagement with a motor where a metal plate is attached to the bottom of the reel and is attracted by a permanent magnetic field extending between a centrally disposed pole and a circumferentially disposed pole, which field is shunted through said plate when said reel is held in driving engagement with the motor, the improvement characterized by said centrally disposed pole being extended a predetermined distance above the plane of said circumferentially disposed pole to a point in said magnetic field where the strength of said field is insufficient to adversely affect the condition of the magnetic tape on said reel when the shunting of said metal plate is no longer effective to control the distribution of said magnetic field as said reel is being removed or replaced.

* * * * *